UNITED STATES PATENT OFFICE.

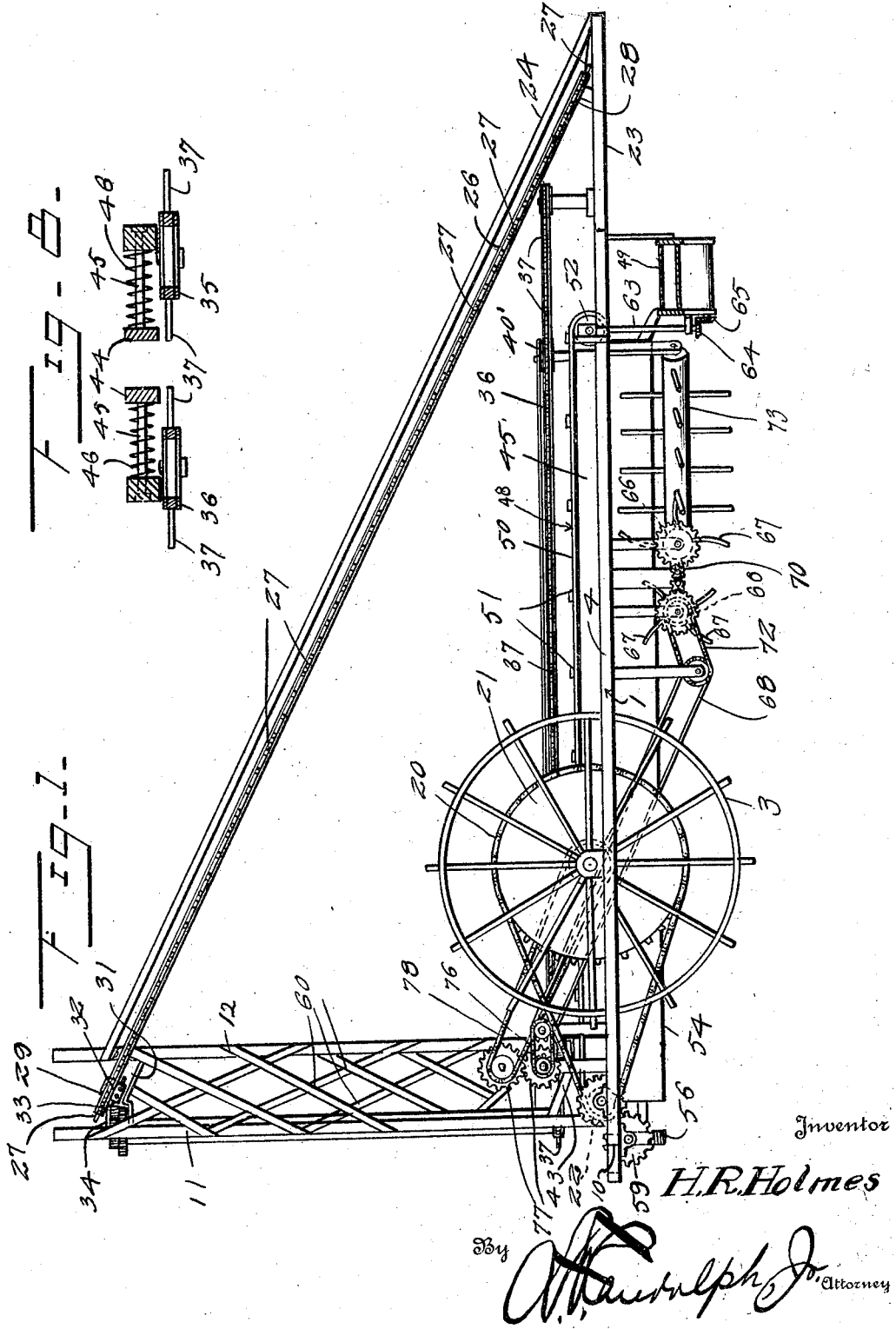

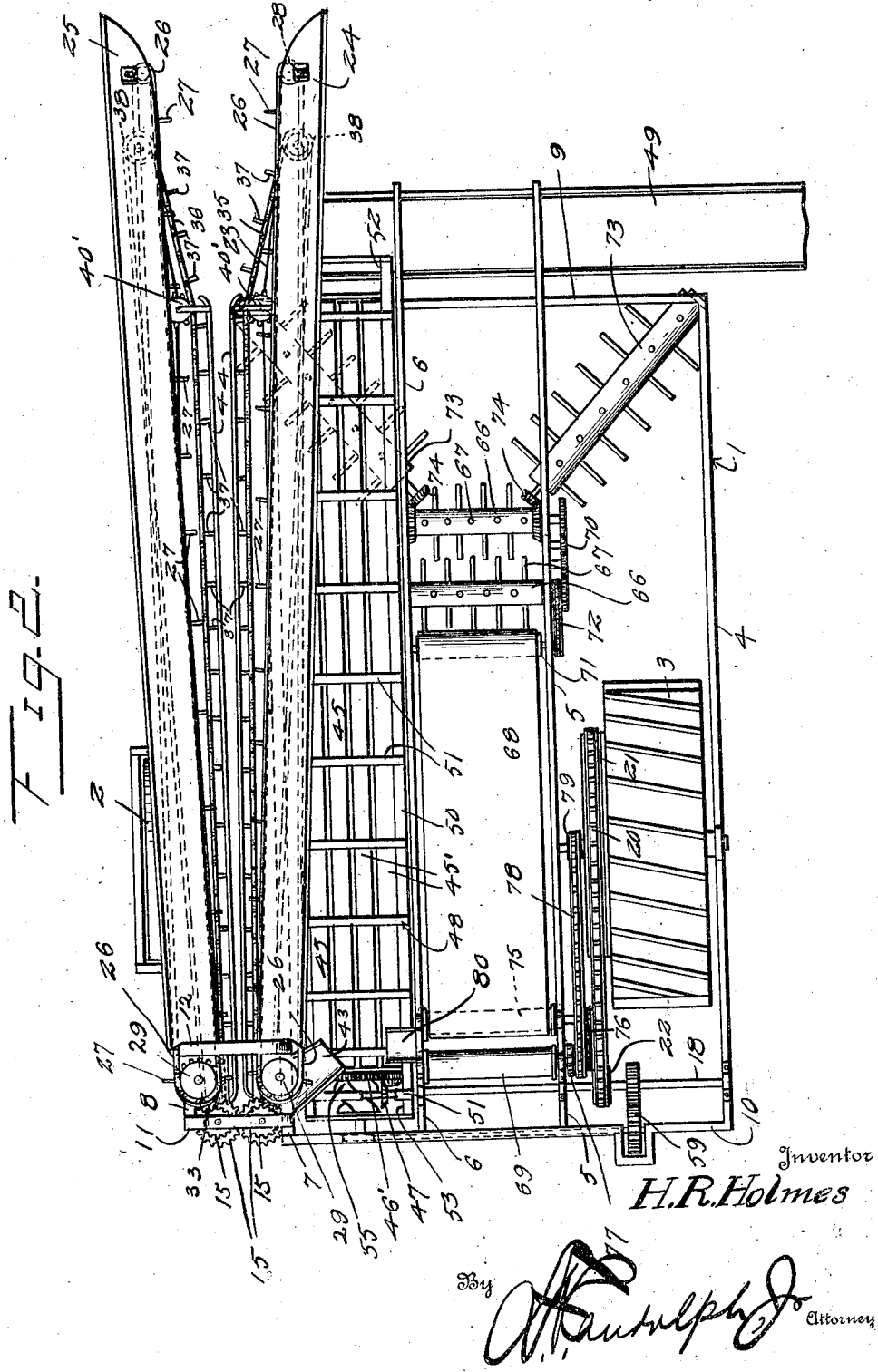

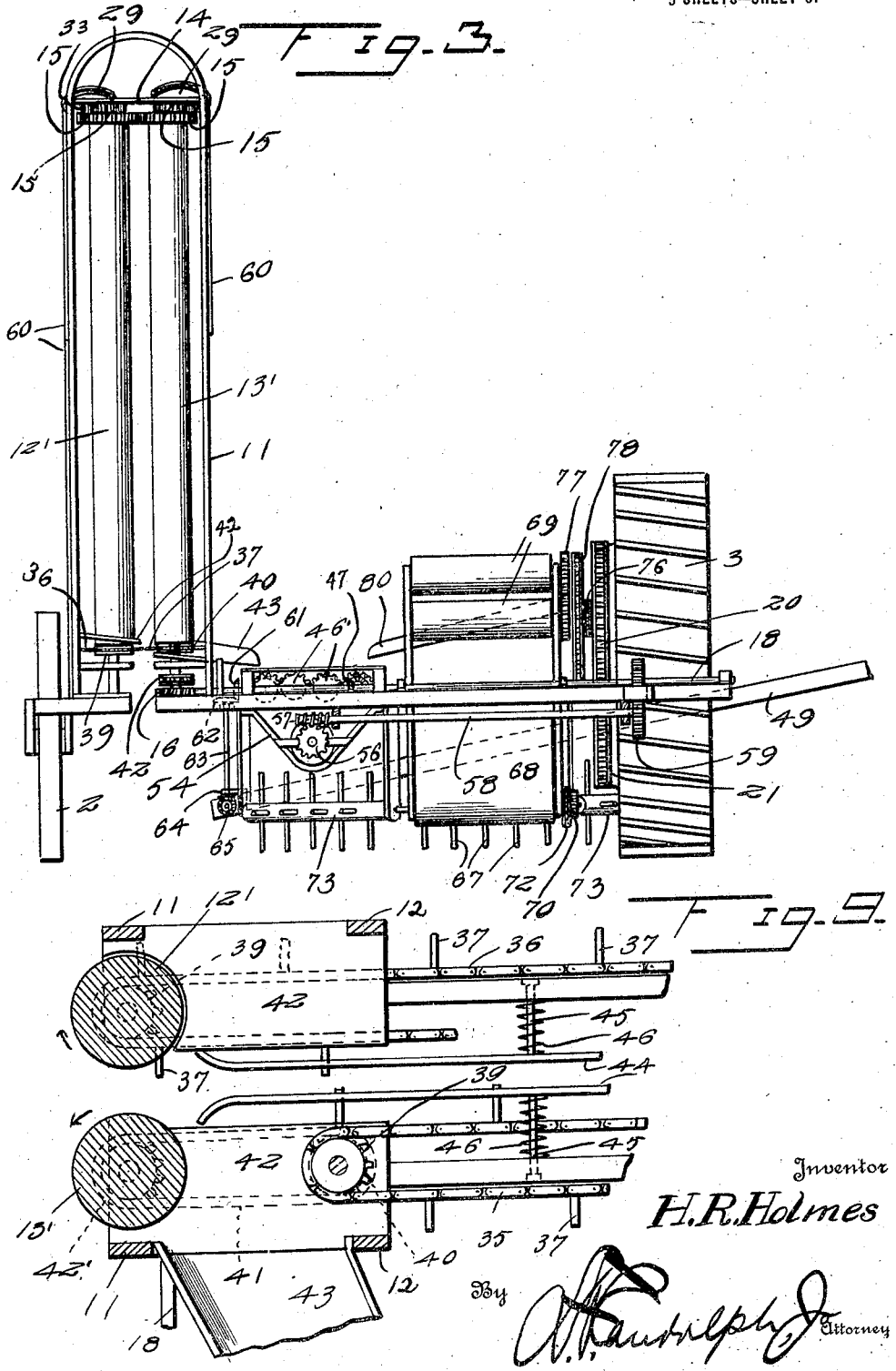

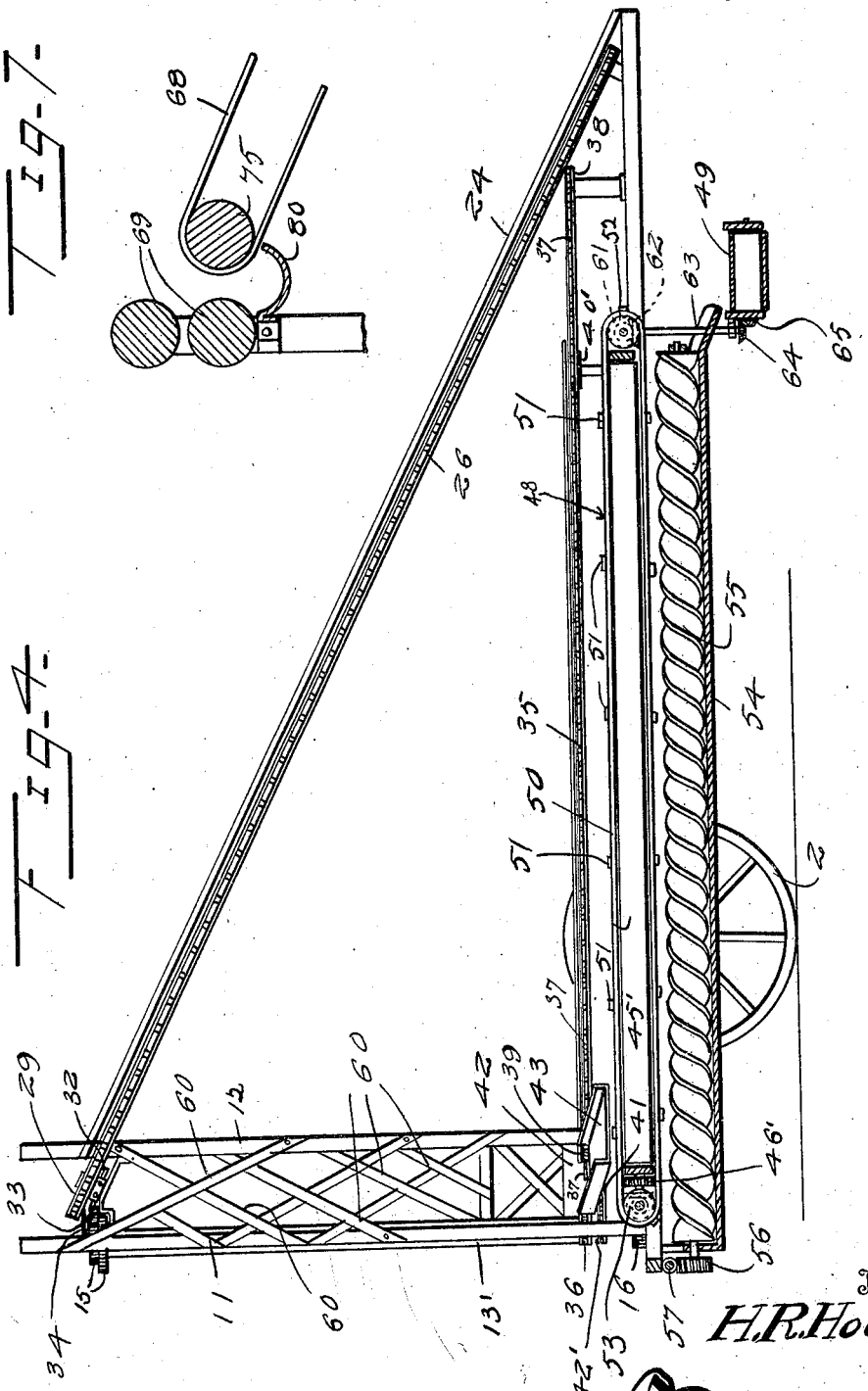

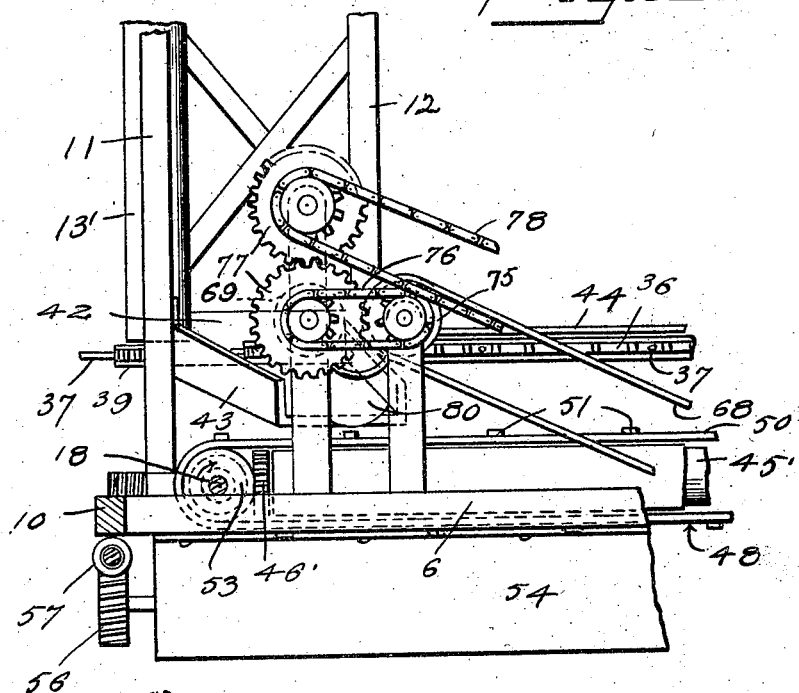

HOWARD R. HOLMES, OF MONTROSE, IOWA.

CORN-HARVESTER.

1,401,781.  Specification of Letters Patent.  Patented Dec. 27, 1921.

Application filed March 21, 1917. Serial No. 156,333.

*To all whom it may concern:*

Be it known that I, HOWARD R. HOLMES, a citizen of the United States, residing at Montrose, in the county of Lee and State of Iowa, have invented certain new and useful Improvements in Corn-Harvesters; and I do hereby declare the following to be a full, clear, and exact description of the invention, such as will enable others skilled in the art to which it appertains to make and use the same.

This invention relates to a corn harvester, and the primary object of the invention is to provide a harvester which will snap the ears of corn from the standing stalks, husk the corn, and deliver the husked ears to a wagon bed or suitable retaining receptacle.

Another object of this invention is to provide means for gathering down stalks, snapping the ears of corn therefrom, and delivering the snapped ears to the corn husking rolls and further to provide a conveyer which is positioned beneath the husking rolls and receives any shelled corn and delivers it to the conveyer for delivery to the retaining receptacle.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of the improved corn harvester,

Fig. 2 is a top plan view illustrating the same,

Fig. 3 is a rear elevation illustrating the device,

Fig. 4 is a longitudinal sectional view illustrating the worm conveyer and husking rollers, Fig. 5 is a fragmentary longitudinal sectional view illustrating the drive for the worm conveyer and the snapping rollers, Fig. 6 is a fragmentary horizontal sectional view, illustrating the drive for the husking rollers, Fig. 7 is a detail sectional view illustrating one pair of snapping rollers, Fig. 8 is a detail sectional view illustrating stalk guiding rods, Fig. 9 is a fragmentary horizontal sectional view, illustrating the conveyers for feeding the stalks to the vertical snapping rollers.

Referring in detail to the drawings, the numeral 1 indicates as an entirety a supporting frame to which a ground wheel 2 is journaled and also a bull wheel 3. The frame 1 includes spaced longitudinally extending bars 4, 5, 6, 7, and 8. The bars 4, 5, 6, and 7 are connected at their forward and rearward ends by transversely extending bars 9 and 10. The space between the bars 7 and 8 forms a corn stalk passage adapted to allow standing stalks to pass therethrough during the forward movement of the machine. Arches 11 and 12 are secured to the rear ends of the bars 7 and 8 and are arranged one in front of the other and are adapted to have the standing corn stalks pass between the upright portions thereof. Vertical snapping rollers 12' and 13' are journaled at their lower ends to the frame 1 and have their upper ends journaled to a brace 14 carried by the arch 11 so that said rollers 12' and 13' are mounted for rotation between the upright portions of said arch 11. The snapping rollers 12' and 13' are connected together at their upper ends by gears 15 which cause them to rotate in opposite directions and the lower end of the snapping roller 13' is provided with a worm gear 16 that meshes with a worm 17 on the end of a drive shaft 18 and the latter is journaled to the rear end of the frame 1 and extends transversely of said frame. The shaft 18 receives its rotation from the bull wheel 3 by an endless sprocket chain 20 that is trained over a sprocket wheel 21 secured to said bull wheel and a sprocket wheel 22 secured to said shaft 18, thus, it will be seen that on the forward movement of the machine, the bull wheel rotates the snapping rollers in opposite directions to each other.

The bars 7 and 8 of the frame 1 are extended to provide supporting and guiding elements 23 between which the standing corn stalks are adapted to first pass and said elements 23 support the forward ends of upwardly and rearwardly inclined guiding members 24 and 25 that have their lower forward ends curved outwardly for guiding the corn stalks therebetween and into the corn passages defined by the bars 7 and 8.

The rear ends of the guiding members 24 and 25 are supported by the upper portions of the arch 12. A pair of endless feed chains or conveyers 26 having fingers 27 are associated with the guiding members 24 and 25 and are trained over pairs of sprocket wheels 28 and 29. The endless chains are adapted to feed the standing corn stalks toward and into engagement with the snapping rollers 12′ and 13′. The pair of sprocket wheels 28 are journaled to the forward ends of the guiding elements 23 while the pair of sprocket wheels 29 are journaled to brackets 31 between the arches 11 and 12 and have gears 32 formed thereon. The gears 32 mesh with idle gears 33 carried by brackets 34 and said idle gears mesh with the gears 15 of the snapping rollers, so that the rotation of the latter will rotate the feed chains 26. The opposing runs of the feed chains 26 project beyond the opposing edges of the guide members 24 and 25 so as to readily engage the stalks of corn. A pair of lower conveyers or endless feed chains 35 and 36 having fingers 37 are associated with the guide elements 23 and the bars 7 and 8 and are trained over pairs of sprocket wheels 38 and 39, and also guide sprocket wheels 40′ that are carried by the bars 7 and 8. The feed chains 35 and 36 coöperate with the feed chains 26 to feed the stalks of corn to the snapping rollers. One of the sprocket wheels 39 is secured to the lower end of the snapping roller 12′ so that the feed chain 36 will be driven thereby. The other sprocket wheel 39 is connected to a sprocket wheel 40 which is secured to the shaft of said sprocket wheel 39 and has a sprocket chain 41 trained thereover, which is in turn trained over a sprocket wheel 42′ secured to the lower end of the snapping roller 13′, whereby the feed chain 35 is driven by the latter. The feed chain 35 is shorter than the feed chain 36 and its respective sprocket wheel 39 is located in advance of the snapping roller 13′ so as to provide a corn discharge space. A table 42 is carried by the frame 1 and arches 11 and 12 to receive the ears of corn as they are removed from the stalks by the snapping rollers and is slightly inclined toward a chute 43 that communicates with the corn discharge space. The table is separated sufficiently to permit the stalks of corn to pass, but will not allow the ears of corn to fall through to the ground when removed from the stalks. The feed chain 36 passes under the table 42 while the feed chain 35 is disposed over a part of said table to permit the fingers 37 thereof to sweep the ears of corn resting on the table 42 and within the corn discharge space into the chute 43. The snapping rollers rotate in the direction indicated by the arrows of Fig. 9 and owing to the direction of rotation of the snapping roller 12′ the ears of corn coming in contact therewith are thrown in the direction of the chute 43 and into the corn discharge space on the table 42 where said ears of corn are caught by the fingers 37 of the feed chain 35 and swept into said chute 43. Rods 44 having outwardly curved ends are arranged between the opposing runs of the feed chains 35 and 36 and in a plane slightly above the latter and are yieldably supported to permit the stalks of corn to pass therebetween and are adapted to catch ears of corn that may fall from the stalks prior to the latter reaching the snapping rollers. The ears of corn that may fall onto said rods are carried rearwardly to the table 42 by the following corn stalks passing to the snapping rollers. The rods 44 are slidably connected to the bars 7 and 8 of the frame 1 by pins 45 and the latter have coil springs 46 thereon which normally urge said rods 44 toward each other and the rods 44 are limited in their movement toward each other by the heads on the ends of said pins.

The chute 43 is adapted to discharge the ears of corn on the rear portions of a series of horizontally disposed husking rollers 45′ located in the space between the bars 6 and 7 of the frame and are journaled to the latter in any suitable manner. The husking rollers have their rear ends geared together by meshing gears 46′ to cause said rollers to rotate in opposite directions. One of the gears 46′ is of a double type and meshes with a gear 47 secured to the drive shaft 18 to rotate the husking rollers by the latter. During the husking of the corn and after the removal of the husks from the ears of corn, the latter are moved forwardly by an apron 48 and deposited onto a laterally extending conveyer 49. The apron includes endless belts 50 connected by flights 51 that traverse the husking rollers. The belts 50 are trained over pairs of pulleys or narrow drums 52 and 53. The pair of drums 52 are journaled at the forward end of the frame, while the drums 53 are secured to the drive shaft 18 to cause rotation of the apron 48.

A trough 54 extends longitudinally under the husking rollers and has its forward end disposed over the conveyer 49 and is adapted to catch any of the kernels of corn that may be shelled from the ears during the husking operation. A worm conveyer 55 is journaled in the trough and is adapted to move the shelled corn forwardly to the conveyer 49. One end of the worm conveyer 55 is provided with a worm gear 56 that meshes with a worm 57 on a shaft 58 and the latter is connected to the drive shaft 18 by gears 59 whereby said worm conveyer 55 is driven from said drive shaft 18.

The arches 11 and 12 are connected together by a plurality of diagonally extending braces 60 adapted to prevent ears of corn that fall on the table 42 adjacent the snapping roller 12' from falling off of the table. One of the drums 52 is provided with a gear 61 that meshes with a gear 62 on a shaft 63 carried by the frame 1 and said shaft 63 is provided with a gear 64 which meshes with a gear 65 secured to one of the drums that support the conveyer 49. The conveyer 49 is inclined upwardly so that corn thereon may be discharged into a wagon or other conveyance traveling at the side of the machine or harvester.

A pair of pick up rollers 66 having tines 67 are journaled to the bars 5 and 6 of the frame and extend transversely of the latter and are adapted to pick up corn stalks that have fallen onto the ground and deposit them onto an apron or conveyer 68 which inclines upwardly and rearwardly and is adapted to convey the corn stalks to a pair of horizontally disposed snapping rollers 69 which are adapted to remove the ears of corn therefrom by the stalks passing between said snapping rollers. The pick up rollers 66 are connected by a train of gears 70 and one of said rollers 66 is connected to a drum 71 that supports one end of the apron 68 by a sprocket chain 72 so that said rollers 66 will be driven by the apron 68 and are adapted to rotate in opposite directions to each other. Diagonally extending raking rollers 73 are journaled to the frame and are driven by one of the pick up rollers 66 through gears 74 and are adapted to rake fallen corn stalks to the front of the pick up rollers 66, so that the latter will catch and pull the stalks up by their roots and place them onto the apron 68. The other end of said apron 68 is supported by a drum 75 which is driven by one of the snapping rollers 69 through the medium of an endless sprocket chain 76, consequently causing a rotation of the apron 68. The snapping rollers 69 are connected together by gears 77 which cause them to rotate in opposite directions and one of said snapping rollers 69 is driven by an endless sprocket chain 78 that is trained over a sprocket wheel 79 secured to the axle of the bull wheel 3 and the latter is secured to said axle, consequently causing a rotation of the snapping rollers so that they will remove the ears of corn from the stalks fed thereto and the corn falls into a chute 80 and is conveyed to the husking rollers 45.

What is claimed is:—

1. In a corn harvester, means for gathering prostrate stalks comprising raking elements disposed transversely of the lines of movement of the harvester, other raking elements located in advance of the first mentioned elements and disposed at angles thereto and lying at acute angles of the line of draft of the harvester, means for operating said raking elements, a conveyer adapted to receive the stalks from the raking elements and snapping rolls located adjacent the delivery end of the conveyer.

2. In a corn harvester, means for gathering prostrate stalks comprising raking elements disposed in parallel relation transversely of the lines of movement of the harvester, additional raking elements extended diagonally of the line of movement of the harvester and in advance of the first mentioned raking elements, and means for operating said first mentioned and said second mentioned raking elements, a conveyer adapted to receive the stalks from the raking elements, and snapping rollers located adjacent the delivery end of the conveyer.

3. In a corn harvester, a common means for husking ears snapped from stalks, means to one side of the first mentioned means for snapping ears from standing stalks and delivering the ears to the husking means, and means to the other side of the common husking means including transverse and diagonal raking elements, means for operating said raking elements, a conveyer adapted to receive the stalks from the raking elements, and snapping rolls located adjacent said conveyer to snap the ears from the gathered stalks and deliver the last mentioned ears to the ear husking means.

In testimony whereof I affix my signature.

HOWARD R. HOLMES.